United States Patent
Lang et al.

(10) Patent No.: US 12,172,509 B2
(45) Date of Patent: Dec. 24, 2024

(54) BATTERY PACK ASSEMBLY FOR A VEHICLE

(71) Applicant: Honda Motor Co., Ltd., Tokyo (JP)

(72) Inventors: Christopher E. Lang, Delaware, OH (US); Ryan A. Arens, Hilliard, OH (US); Brian E. Dressel, Worthington, OH (US); Carolyn A. Leblanc, Marysville, OH (US); Christopher J. Mampe, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 846 days.

(21) Appl. No.: 17/345,224

(22) Filed: Jun. 11, 2021

(65) Prior Publication Data
US 2022/0396138 A1    Dec. 15, 2022

(51) Int. Cl.
*B60K 1/04*      (2019.01)
*B60L 50/60*     (2019.01)
*B62D 25/20*     (2006.01)

(52) U.S. Cl.
CPC ........... *B60K 1/04* (2013.01); *B60L 50/66* (2019.02); *B62D 25/20* (2013.01); *B60K 2001/0438* (2013.01)

(58) Field of Classification Search
CPC ............................................ B60K 2001/0438
See application file for complete search history.

(56) References Cited

U.S. PATENT DOCUMENTS

| | | | |
|---|---|---|---|
| 8,839,895 B2* | 9/2014 | Kato | B60K 1/04 |
| | | | 180/68.5 |
| 9,034,502 B2* | 5/2015 | Kano | B62D 21/157 |
| | | | 429/99 |
| 9,821,645 B2* | 11/2017 | Hayashi | B62D 25/20 |
| 9,944,161 B2 | 4/2018 | Shimasaki et al. | |
| 10,207,574 B2* | 2/2019 | Ozawa | H01M 50/204 |
| 10,434,893 B2 | 10/2019 | Yamamoto et al. | |

(Continued)

FOREIGN PATENT DOCUMENTS

| | | |
|---|---|---|
| CN | 109515216 | 3/2019 |
| CN | 210092174 | 2/2020 |

(Continued)

OTHER PUBLICATIONS

Translation of DE 102019107728 a1 (Year: 2019).*

*Primary Examiner* — Katy M Ebner
(74) *Attorney, Agent, or Firm* — RANKIN, HILL & CLARK LLP (57) ABSTRACT

A battery pack assembly for a vehicle includes a tray assembly fixed under a floor panel in a vehicle height direction and on which a battery pack-associated component is placed. The tray assembly has a base with a first edge portion and a second edge portion opposite the first edge portion. Each of the first and second edge portions is extended upward relative to the height direction from the base and secured to a frame assembly. A deformation feature is provided at a transition area between the base and the second edge portion. During a crash event the second edge portion is adapted to bend toward the base via the deformation feature allowing a displacement of the base in one of a vehicle front-back direction and a vehicle width direction and also downward in the height direction.

19 Claims, 8 Drawing Sheets

(56) References Cited

U.S. PATENT DOCUMENTS

| | | | |
|---|---|---|---|
| 10,464,406 B2 | 11/2019 | Kawabe et al. | |
| 10,476,117 B2 | 11/2019 | Ito et al. | |
| 10,583,747 B2 * | 3/2020 | Kotik | H01M 50/262 |
| 10,603,999 B2 * | 3/2020 | Fukui | B62D 25/20 |
| 10,651,440 B1 * | 5/2020 | Khan | H01M 50/249 |
| 11,034,229 B2 * | 6/2021 | Kosuge | B60L 50/64 |
| 11,091,017 B2 * | 8/2021 | Shin | B60L 50/64 |
| 11,247,550 B2 * | 2/2022 | Grace | H01M 50/262 |
| 11,446,998 B2 * | 9/2022 | Kodama | B60K 1/04 |
| 11,654,762 B2 * | 5/2023 | Kohara | B60K 6/26 |
| | | | 180/65.21 |
| 11,769,923 B2 * | 9/2023 | Sassi | H01M 50/262 |
| | | | 180/68.5 |
| 2013/0075173 A1 * | 3/2013 | Kato | H01M 50/249 |
| | | | 180/68.5 |
| 2018/0236863 A1 * | 8/2018 | Kawabe | B60K 1/04 |
| 2020/0070641 A1 * | 3/2020 | Kosuge | B60L 50/66 |
| 2020/0070671 A1 * | 3/2020 | Ohkuma | B60K 1/04 |
| 2020/0156486 A1 | 5/2020 | Howard et al. | |
| 2020/0227706 A1 * | 7/2020 | Kuno | B60K 1/04 |
| 2020/0307366 A1 * | 10/2020 | Grace | B60L 50/66 |
| 2020/0376947 A1 * | 12/2020 | Yamada | B60K 1/04 |
| 2024/0051605 A1 * | 2/2024 | Naruke | B60L 50/64 |

FOREIGN PATENT DOCUMENTS

| | | | |
|---|---|---|---|
| DE | 102019101728 A1 * | 9/2019 | B60R 16/02 |
| DE | 102019203045 | 9/2020 | |
| KR | 20120050234 | 5/2012 | |
| WO | WO2012018202 | 2/2012 | |
| WO | WO2019185030 | 10/2019 | |

* cited by examiner

BATTERY PACK ASSEMBLY FOR A VEHICLE

BACKGROUND

Conventionally, a battery pack assembly for an electric vehicle (for example, a battery electric vehicle, a plug-in hybrid electric vehicle, and a hybrid electric vehicle) is disposed below a floor panel of a vehicle body. In order to prevent damage to a battery pack-associated component (e.g., a battery pack and/or a DC-DC converter) of the battery pack assembly upon a side collision of the vehicle, it is known to provide a deformable member extending from a side sill of a frame assembly to the battery pack assembly. Rigid boxes or struts can also be provided to protect the battery pack assembly from direct mechanical impact during a side collision. However, with certain vehicle body structures, the battery pack assembly can still be displaced so as to protrude upward by a load input upon the side collision of the vehicle and/or by a load input from beneath the vehicle. Because such a displacement may damage the battery pack-associated component, there is an ongoing design need to reliably protect the battery pack assembly upon the side collision of the vehicle.

BRIEF DESCRIPTION

According to one aspect, a battery pack assembly for a vehicle is provided. The vehicle includes a floor panel secured to a frame assembly. The battery pack assembly comprises a tray assembly fixed under the floor panel in a height direction of the vehicle and on which at least one battery pack-associated component is placed. The tray assembly has a base with a first edge portion and a second edge portion opposite the first edge portion. Each of the first edge portion and the second edge portion is extended upward relative to the height direction from the base and secured to the frame assembly. A deformation feature is provided at a transition area between the base and the second edge portion. During a crash event the second edge portion is adapted to bend toward the base via the deformation feature allowing a displacement of the base in one of a front-back direction of the vehicle and a width direction of the vehicle and also downward in the height direction.

According to another aspect, a vehicle comprises a frame assembly having a side sill and a center member both extended in a front-back direction of the vehicle and cross members extended in a width direction of the vehicle. A floor panel is secured to the frame assembly. A battery pack assembly is secured under the frame assembly in a height direction of the vehicle. The battery pack assembly includes a tray assembly on which at least one battery pack-associated component is placed. The tray assembly includes a lower tray and an upper tray relative to the height direction. The lower tray is secured to the upper tray, the upper tray with an outboard edge portion and an inboard edge portion relative to the width direction, the outboard edge portion secured to the side sill and the inboard edge portion secured to the center member. A deformation feature is formed on the upper tray and defines a bend location on the upper tray where during a side crash event the tray assembly is displaceable both laterally in the width direction and downward in the height direction.

According to another aspect, a battery pack assembly for a vehicle is provided. The vehicle includes a floor panel secured to a frame assembly having a side sill and a center member both extended in a front-back direction of the vehicle and cross members extended in a width direction of the vehicle. The battery pack assembly comprises a tray assembly fixed under the floor panel in a height direction of the vehicle and on which first and second battery pack-associated components are placed. The tray assembly includes a lower tray, an upper tray relative to the height direction, and an upper component tray relative to the height direction. The lower tray is secured to the upper tray and the component tray. The first battery pack-associated component is mounted to the component tray, and the second battery pack-associated component mounted to the upper tray. The component tray is configured so that a first gap is provided between the lower tray and the component tray at a mounting location of the first battery pack-associated component, the first gap allowing for an upward deformation of the lower tray without a corresponding upward deformation of the component tray. The upper tray is configured so that a second gap is provided between the lower tray and the upper tray at a mounting location of the second battery pack-associated component, the second gap allowing for an upward deformation of the lower tray without a corresponding upward deformation of the upper tray.

DETAILED DESCRIPTION

Figure 1:
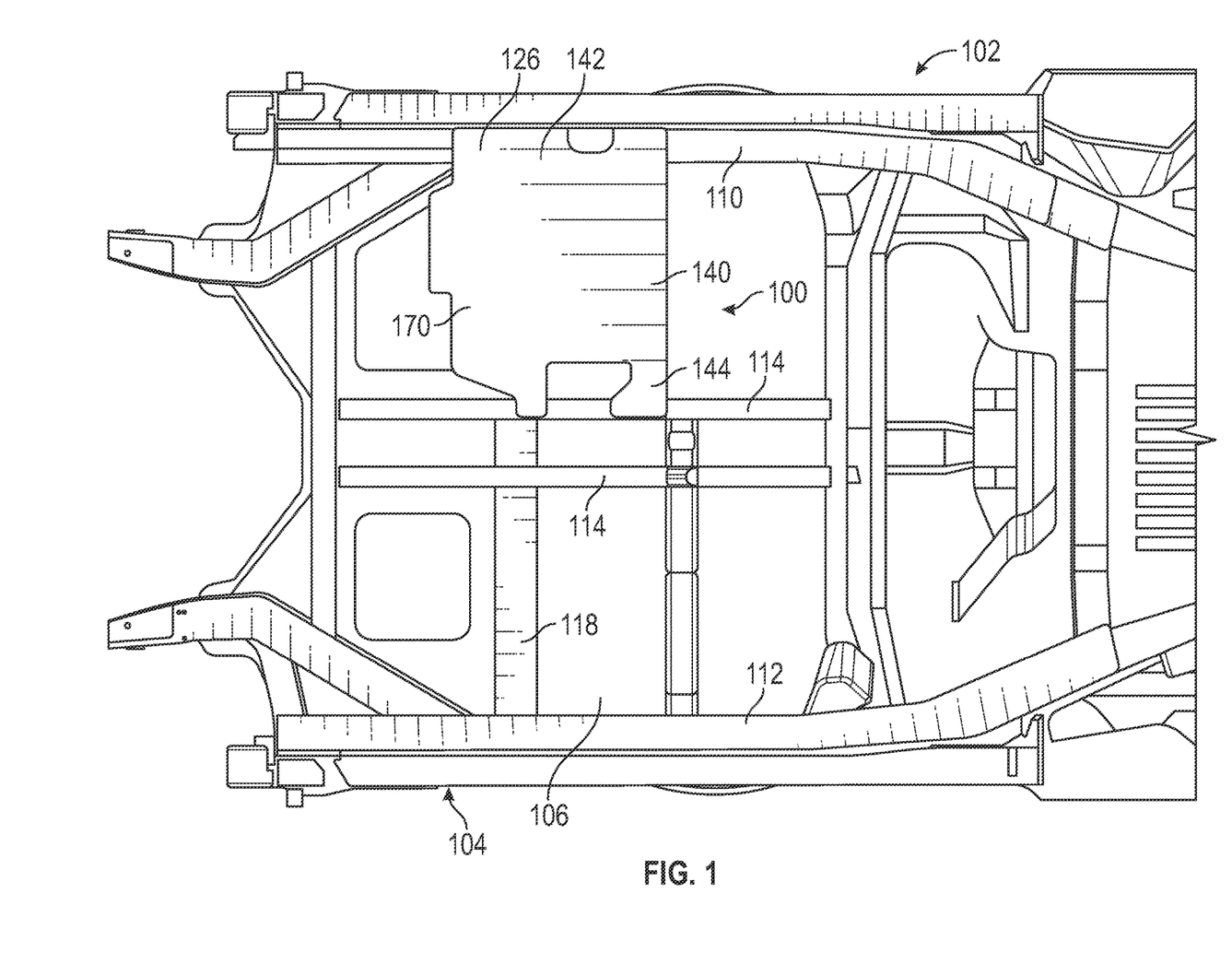
FIG. 1 is a bottom schematic plan view of a vehicle including a floor panel secured to a frame assembly and a battery pack assembly fixed under the floor panel
Figure 2:
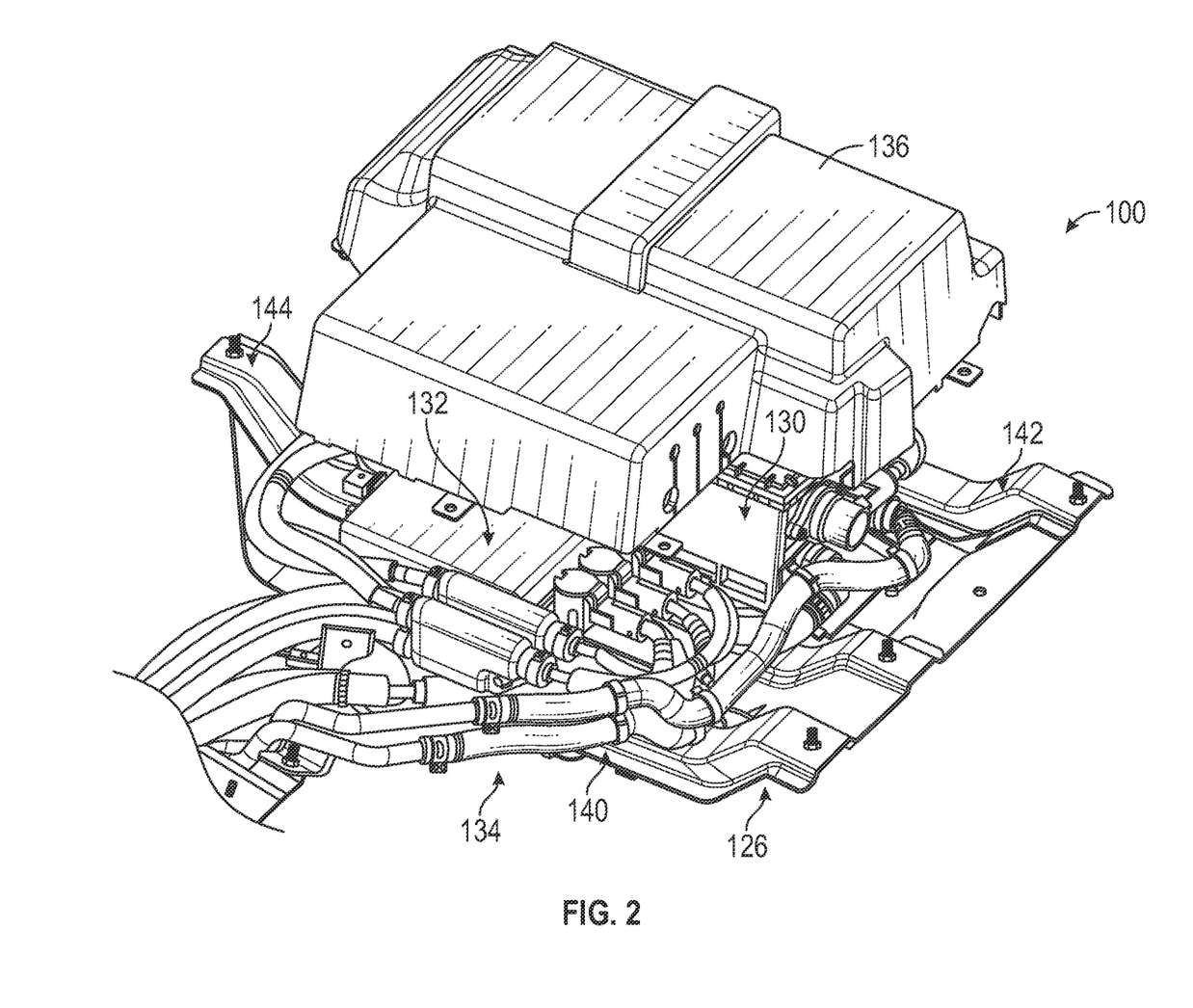
FIG. 2 is a partial exploded perspective view of the battery pack assembly including a tray assembly for supporting one battery pack-associated component and a cover.
Figure 3:
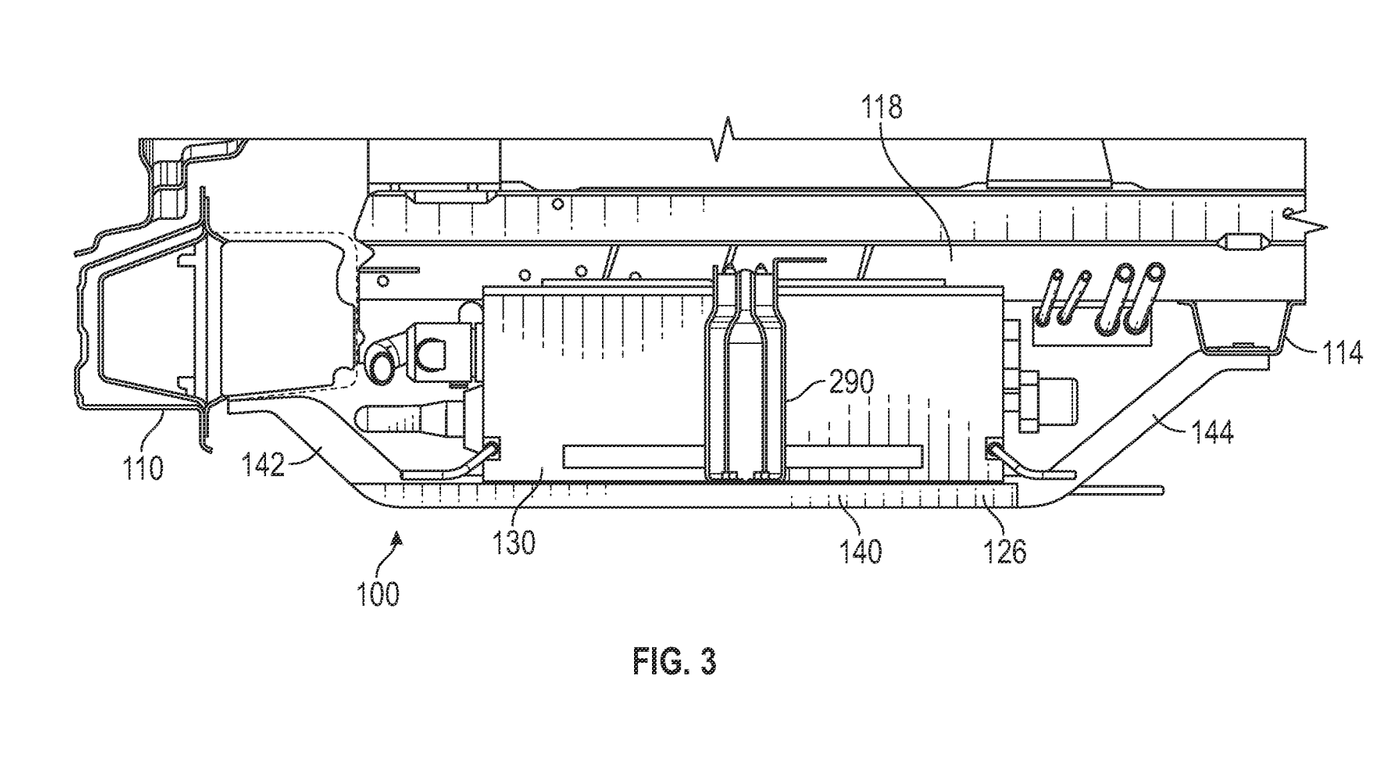
FIG. 3 is a partial view of FIG. 1 showing the battery pack assembly sans the cover mounted the vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a battery pack assembly 100 according to the present disclosure mounted beneath a vehicle body 102 of an electric vehicle (for example, a battery electric vehicle, a plug-in hybrid electric vehicle, and a hybrid electric vehicle). In this example embodiment, the term "vehicle body" is used generically, and should be interpreted to include structural components of the vehicle, such as a frame assembly 104 and a floor panel 106 secured to the frame assembly. The vehicle body 102 extends in a front-rear (longitudinal) direction, a left-right (width) direction, and an up-down (height or vertical) direction of the vehicle. Further, the depicted frame assembly includes side sills 110, 112 and a center member(s) 114 extended in the longitudinal direction and a cross member(s) 118 extended in the width direction. The battery pack assembly 100 is arranged below the floor panel 106 that forms a floor surface in the height direction and is positioned between one of the side sills (for example, side sill 110) and the center member(s) 114 in the width direction.

With reference to FIGS. 2-5, the battery pack assembly 100 of the present disclosure comprises a tray assembly 126 on which at least one battery pack-associated component is placed. According to the depicted aspect, the at least one battery pack-associated component is a battery pack 130 (typically designed as a 48-volt battery) and a DC-DC converter 132, together with at least a battery cooling circuit 134. A cover 136 for covering the battery pack-associated components 130, 132 is mounted to the tray assembly 126. The tray assembly 126 generally has a base 140 with a first edge portion 142 and a second edge portion 144 opposite the first edge portion, with a spatial orientation of the first and second end portions 142, 144 dependent on the mounting of the tray assembly to the frame assembly 104. By way of example, the tray assembly 126 can be arranged relative to the frame assembly 104 such that the first edge portion 142 is one of a forward and a rear edge portion and the second end portion 144 is the other of the forward and the rear edge portion relative to the front-rear direction. In the depicted arrangement of the tray assembly 126 relative to the frame assembly 104, the first edge portion is an outboard edge portion 142 and the second end portion is an inboard edge portion 144 relative to the width direction, and features of the tray assembly will be described with respect to this orientation. Each of the outboard edge portion and the inboard edge is extended upward relative to the height direction from the base 140, with the outboard edge portion 142 secured to the side sill 110 and the inboard edge portion 144 secured to one of the center members 114. The battery pack assembly 100 is designed and configured to protect the battery pack-associated components 130, 132 from damage due to a load input upon a crash event (e.g., a side crash event) and/or a load input from beneath the vehicle.

Figure 9:
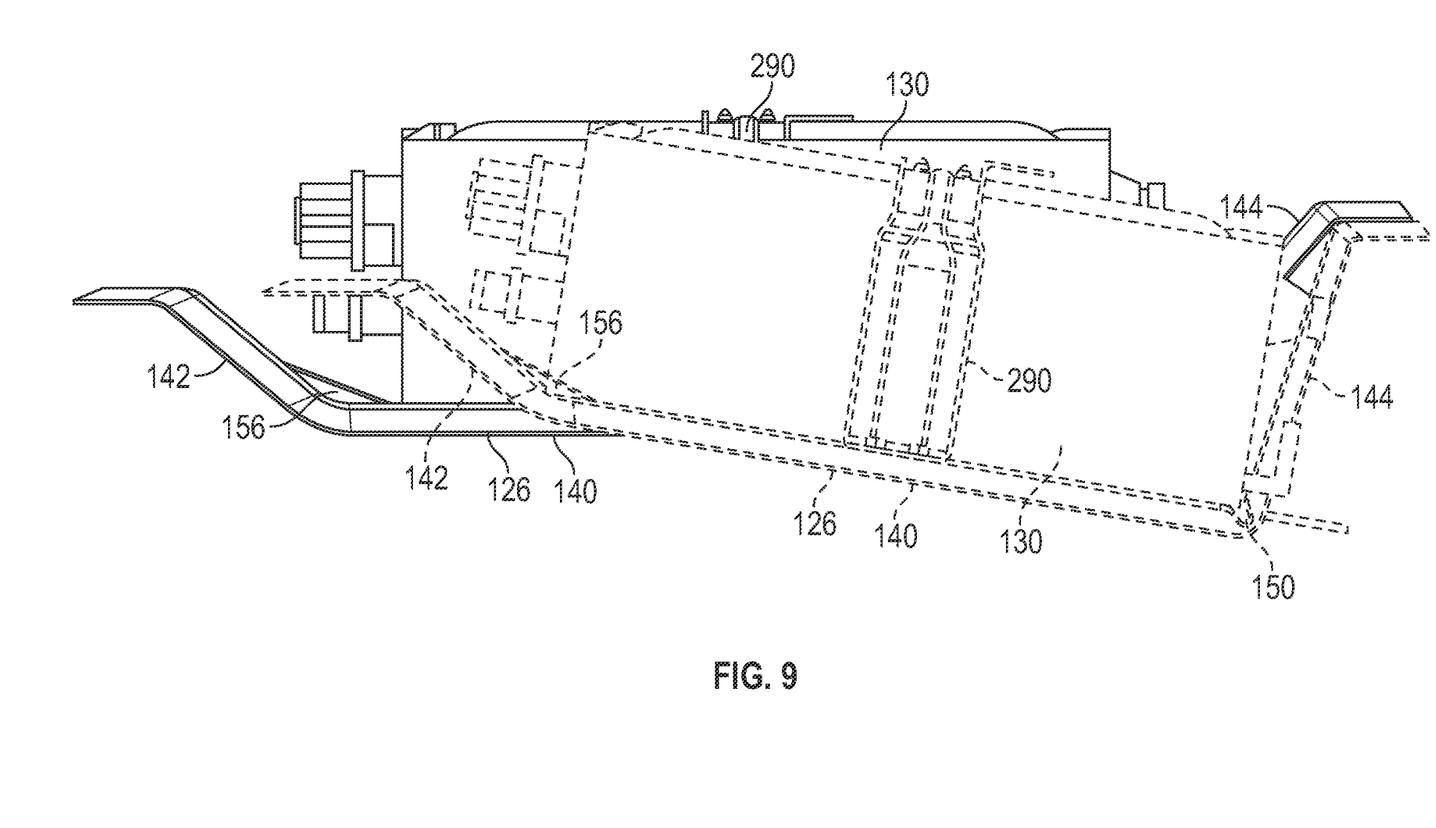
FIG. 9 depicts movement of the battery pack assembly during a side crash event.

As will be described, a deformation feature 150 is provided at an inboard transition area 152 between the base 140 and the inboard edge portion 144. In FIG. 9, during a side crash event the inboard edge portion 144 is adapted to bend toward the base 140 via the deformation feature 150 allowing a displacement of the base 140 laterally in the width direction and downward in the height direction. To ensure this bending of the inboard edge portion 144, a stiffening feature 156 is provided at an outboard transition area 158 between the base 140 and the outboard edge portion 142, the stiffening feature adapted to substantially maintain an orientation of the outboard edge portion 142 relative to the base 140 during a side crash event. This lateral and downward displacement, in turn, moves the battery pack-associated components 130, 132 away from the frame assembly 104 and/or the floor panel 106. The battery pack assembly 100 is further designed and configured to protect the battery pack-associated components 130, 132 from damage by contact below of the tray assembly 126 with an obstacle (for example, a bump, a stone, and the like). As will be described with respect to FIGS. 10 and 11, the tray assembly 126 is configured so that a gap is provided between the tray assembly and the battery pack-associated components 130, 132, the gap allowing for an upward deformation of the tray assembly 126 due to a load input from beneath the vehicle without a corresponding upward displacement of the battery pack-associated components 130, 132. This restriction of displacement, in turn, prevents contact of the battery pack-associated components 130, 132 with the frame assembly 104 and/or the floor panel 106.

Figure 4:
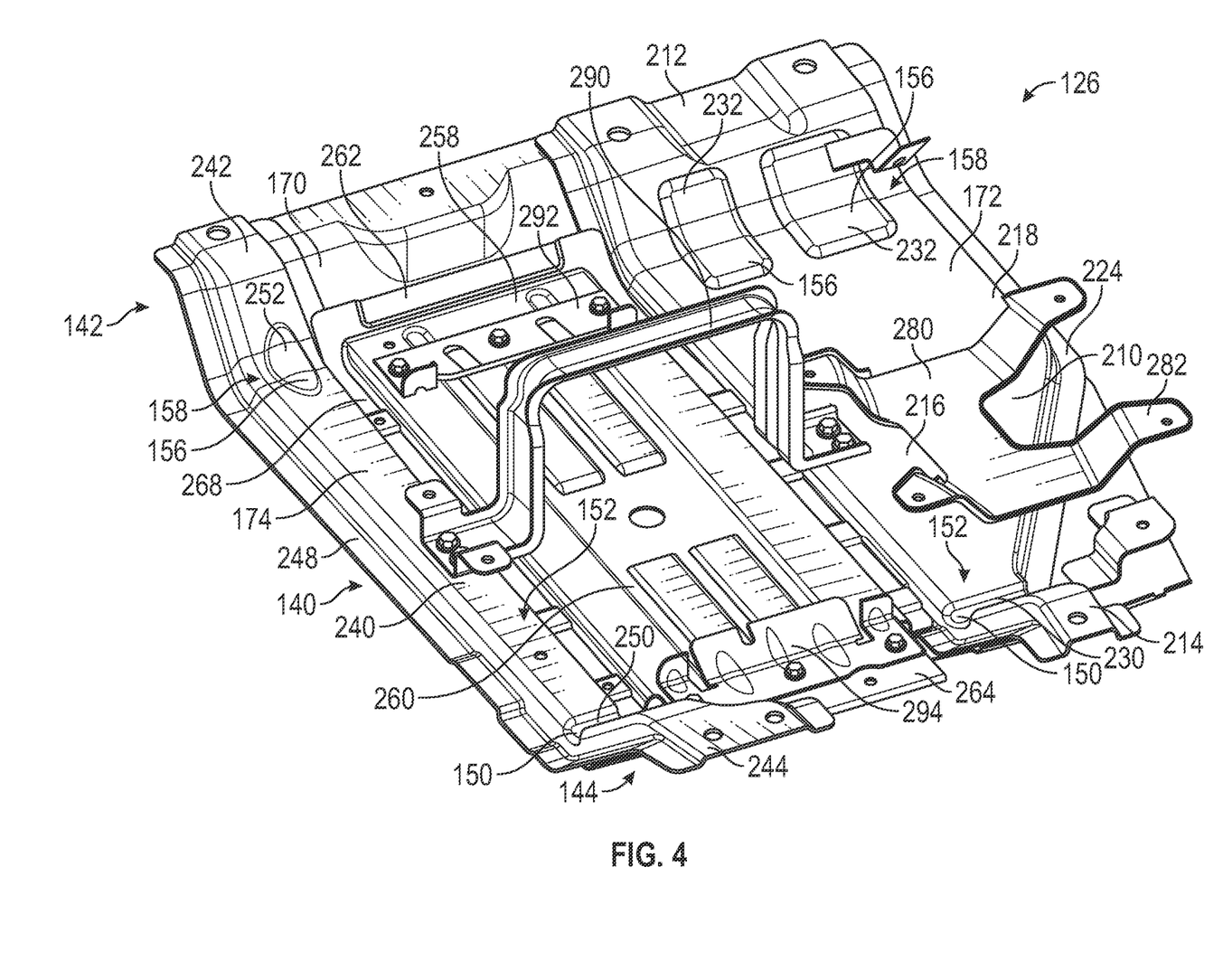
FIG. 4 is a perspective view of a tray assembly of the battery pack assembly.
Figure 5:
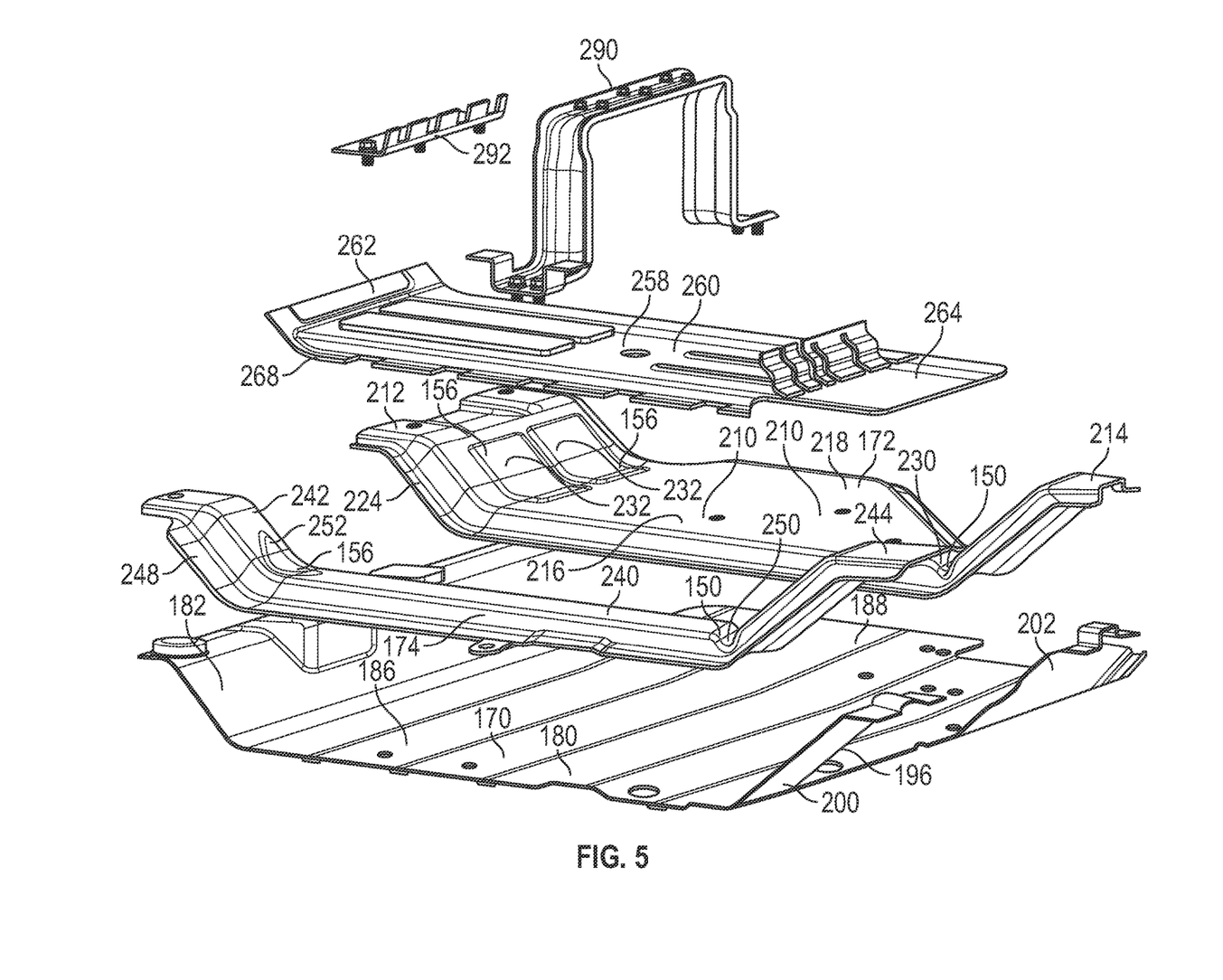
FIG. 5 is an exploded perspective view of FIG. 4.
Figures 6, 7, 8:
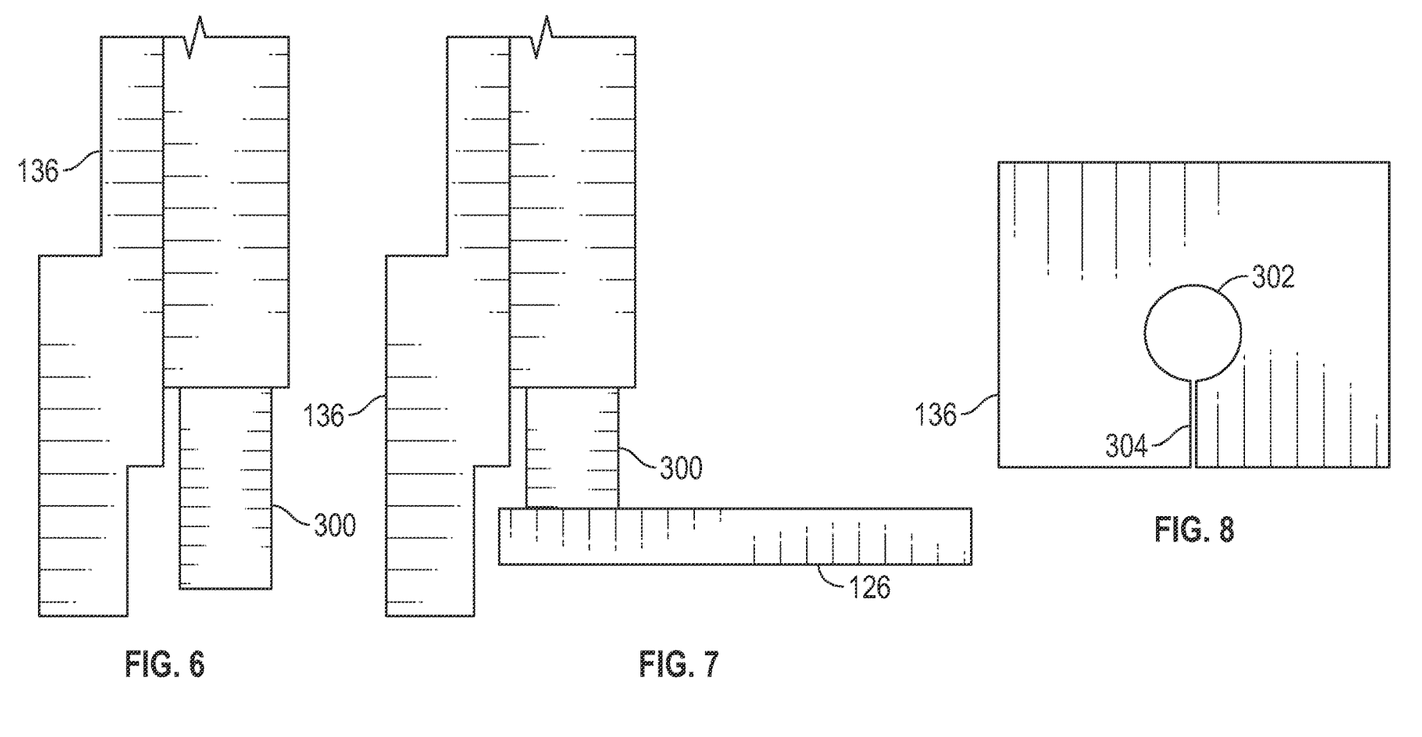
FIGS. 6, 7 and 8 are schematic views of a cover and the tray assembly of FIG. 2.

In FIGS. 4 and 5, the exemplary tray assembly 126 includes the base 140 with the outboard edge portion 142 and the inboard edge portion 144 relative to the width direction. More particularly, the tray assembly 126 includes a lower tray 170, and an upper tray 172 and an upper support member 174 relative to the height direction. The lower tray includes a base 180 with an outboard edge portion 182, and inboard edge portion 184 spaced inboard in the width direction of the outboard edge portion, a forward edge portion 186, and a rear edge portion 188 spaced rearward in the front-rear direction of the forward edge portion. The base 180 defines part of the base 140, the outboard edge portion 182 defines part of the outboard edge portion 142 and the inboard edge portion 184 defines part of the inboard edge portion 144. In the depicted aspect, the inboard edge portion 184 of the lower tray 170 includes a cutout 196 so as to split the inboard edge portion 184 into first and second inboard edge portions 200, 202.

The upper tray 172 is secured to the lower tray 170 covering the rear edge portion 188 of the lower tray. The upper tray 172 includes a base 210 with an outboard edge portion 212, and inboard edge portion 214 spaced inboard in the width direction of the outboard edge portion, a forward edge portion 216, and a rear edge portion 218 spaced rearward in the front-rear direction of the forward edge portion. The base 210 defines part of the base 140, the outboard edge portion 212 defines part of the outboard edge portion 142 and the inboard edge portion 214 defines part of the inboard edge portion 144. A mounting flange 224 extended about a periphery of the base 210 is directly secured to the lower tray (e.g., by welding), the mounting flange 224 adapted to raise the base 210 from the lower tray 170 in the height direction to thereby define a gap or space 226 between the lower and upper trays (see FIGS. 10 and 11). In the depicted aspect, the outboard edge portion 212 overlays the outboard edge portion 182 of the lower tray 170 and the inboard edge portion 214 overlays the second inboard edge portion 202 of the lower tray. Further, the deformation feature 150 is a groove 230 formed in the upper tray 172 and the stiffening feature 156 is at least one outwardly extended rib 232 formed in the upper tray 172. More specifically, the groove 230 is formed in the base 210 at an inboard transition area of the base 210 and the inboard edge portion 214, and the at least one outwardly extended rib 232 is formed at an outboard transition area of the base 210 and the outboard edge portion 212.

The upper support member 174 is secured to the lower tray 170 along the forward edge portion 186 of the lower tray. The upper support member 174 is generally hat-shaped and includes a base 240 with an outboard edge portion 222 and inboard edge portion 244 spaced inboard in the width direction of the outboard edge portion. The base 240 defines part of the base 140, the outboard edge portion 242 defines part of the outboard edge portion 142 and the inboard edge portion 214 defines part of the inboard edge portion 144. A mounting flange 248 extended about a periphery of the base 240 is directly secured to the lower tray (e.g., by welding). In the depicted aspect, the outboard edge portion 242 overlays the outboard edge portion 182 of the lower tray 170 and the inboard edge portion 244 overlays the first inboard edge portion 200 of the lower tray. Further, the deformation feature 150 is a groove 250 formed in the upper support member 174 and the stiffening feature 156 is an outwardly extended rib 252 formed in the upper support member 174. More specifically, the groove 250 is formed in the base 240 at an inboard transition area of the base 240 and the inboard edge portion 244, and the outwardly extended rib 252 is formed at an outboard transition area of the base 240 and the outboard edge portion 242.

With the upper support member 174 spaced from the upper tray 172 in the front-back direction, the tray assembly 126 further includes a component tray 258 located in a space between the upper tray and the upper support member and secured to the lower tray 170. The component tray 258 is adapted for mounting of the at least one battery back-associated component, specifically the battery back 130. The component tray 258 includes a base 260 with an outboard edge portion 262, and inboard edge portion 264 spaced inboard in the width direction of the outboard edge portion. The outboard edge portion 262 at least partially overlays the outboard edge portion 182 of the lower tray 170, and the inboard edge portion 264 extends between the first and second inboard edge portions 200, 202 of the lower tray. A mounting flange 268 extended about a periphery of the base 260 is directly secured to the lower tray (e.g., by welding), the mounting flange 268 adapted to raise the base 260 from the lower tray in the height direction to thereby define a gap or space 270 between the lower tray 170 and the component tray 258 (see FIGS. 10 and 11).

Further depicted in FIGS. 4 and 5 is a mounting bracket 280 attached to the base 240 of the upper tray 172. The mounting bracket 280 is provided with arms 282 adapted for direct connection to the DC-DC converter 132. A strap 290 for the battery pack 130 is attached between the upper tray 172 and the upper support member 174. Additional support brackets 292, 294 for the battery pack 130 are attached to the component tray 258.

With reference to FIGS. 2 and 6-8, the cover 136 is formed in a box shape that has a bottom and that opens downward and mainly constitutes upper and side parts of the battery pack assembly 100. A protrusion or a recess that corresponds to the height of each of the battery back-associated component 130, 132 which are arranged on the tray assembly 126 described above is formed at a region of the cover 136 that constitutes an upper part of the battery case assembly. A fit part between the tray assembly 126 and the cover 136 is sealed via an annular seal member 300 that extends along a circumferential edge part of the cover 136 and is adapted to be compressed against tray assembly 126. Further, exit holes 302 in the cover 136 for, for example, cooling tubes of the cooling circuit 134 are provided with a split seal 304 to prevent water and dirt intrusion into the cover 136.

In FIG. 9, during a side crash event the inboard edge portion 144 (as defined by the respective inboard edge portions 184, 214, 244 of the lower tray 170, upper tray 172, and the upper support member 174) is adapted to bend about the deformation feature 150 (as defined by the respective 230, 250 grooves in the upper tray 172 and the upper support member 174) toward the base 140 allowing a displacement of the base 140 laterally in the width direction and downward in the height direction. To ensure this bending of the inboard edge portion 144, the stiffening feature 156 (as defined by the respective ribs 232, 252 on the upper tray 172 and the upper support member 174) provided at the outboard edge portion 142 (as defined by the respective outboard edge portions 182, 212, 242 of the lower tray 170, upper tray 172, and the upper support member 174) is adapted to substantially maintain an orientation of the outboard edge portion 142 relative to the base 140 during a side crash event. This lateral and downward displacement of the tray assembly 126 (shown in dashed lines in FIG. 9), in turn, moves the battery pack-associated components 130, 132 away from the frame assembly 104 and/or the floor panel 106. Therefore, by movement of the tray assembly 126 in a controlled manner, kinetic energy can be dissipated in the event of a side impact of the vehicle without the battery pack-associated components being deformed or damaged due to impact with the frame assembly 104 and/or the floor panel 106.

Figure 10:
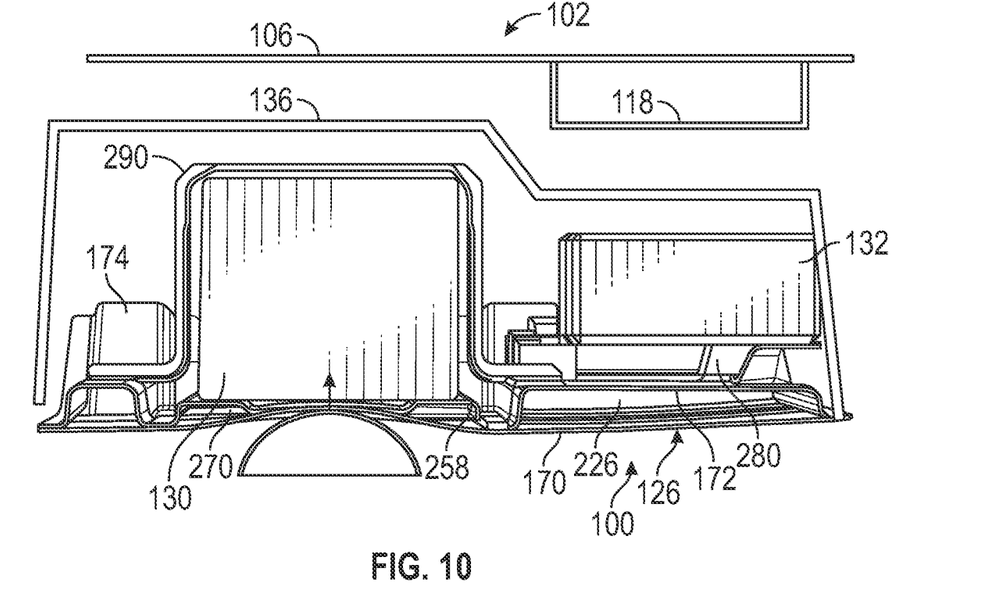
FIGS. 10 and 11 depict deformation of the battery pack assembly upon contact with a ground obstacle.
Figure 11:
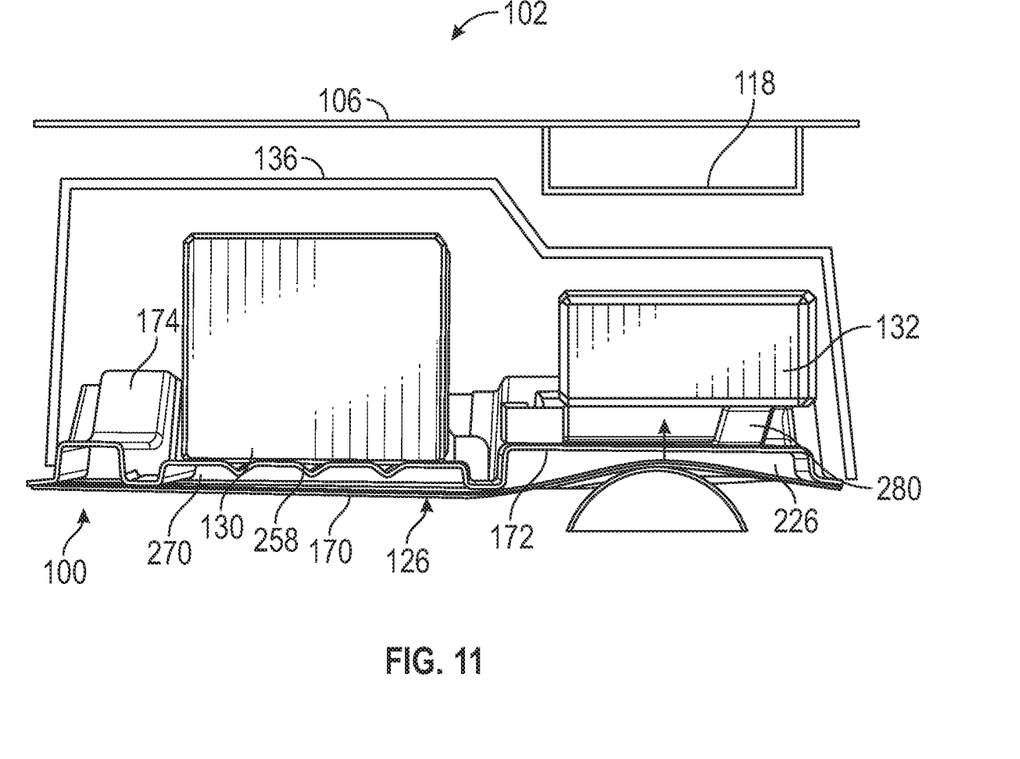

With reference to FIGS. 10 and 11, the battery pack assembly 100 is further designed and configured to protect the battery pack-associated components 130, 132 from damage by contact below of the tray assembly 126 with an obstacle (for example, a bump, a stone, and the like). The upper tray 172 is configured so that the gap 226 is provided between the lower tray 170 and the upper tray 172 at a mounting location of the DC-DC converter 132 on the upper tray, the gap allowing for an upward deformation of the lower tray 170 without a corresponding upward deformation of the upper tray 172. The component tray 258 is configured so that the gap 270 is provided between the lower tray 170 and the component tray, the gap allowing for an upward deformation of the lower tray 170 without a corresponding upward deformation of the component tray, and the battery back 130 mounted thereon. This restriction of displacement substantially maintains a height spacing between the vehicle body 102 and the battery pack assembly 100, thereby preventing contact of the battery pack-associated components 130, 132 with the frame assembly 104 and/or the floor panel 106.

It will be appreciated that the above-disclosed and other features and functions, or alternatives or varieties thereof, may be desirably combined into many other different systems or applications. Further, any term of degree used herein, such as "substantially," means a reasonable amount of deviation of the modified word is contemplated such that the end result is not significantly changed. Also that various presently unforeseen or unanticipated alternatives, modifications, variations or improvements therein may be subsequently made by those skilled in the art which are also intended to be encompassed by the following claims.

The invention claimed is:

1. A battery pack assembly for a vehicle, the vehicle including a floor panel secured to a frame assembly, the battery pack assembly comprising:
   a tray assembly fixed under the floor panel in a height direction of the vehicle and on which at least one battery pack-associated component is placed, the tray assembly having a base with a first edge portion and a second edge portion opposite the first edge portion, each of the first edge portion and the second edge portion is extended upward relative to the height direction from the base and secured to the frame assembly, a deformation feature is provided at a transition area between the base and the second edge portion, wherein during a crash event the second edge portion is adapted to bend toward the base via the deformation feature allowing a displacement of the base in one of a front-back direction of the vehicle and a width direction of the vehicle and also downward in the height direction,
   wherein the tray assembly includes a lower tray and an upper tray relative to the height direction, the upper tray secured to the lower tray, each of the lower tray and the upper tray adapted to bend about the deformation feature.

2. The battery pack assembly of claim 1, wherein a stiffening feature is provided at a transition area between the base and the first edge portion, the stiffening feature adapted to substantially maintain an orientation of the first edge portion relative to the base during a crash event.

3. The battery pack assembly of claim 1, wherein the deformation feature is a groove formed in the upper tray and the stiffening feature is an outwardly extended rib formed in the upper tray.

4. The battery back of claim 1, wherein the tray assembly includes an upper support member secured to the lower tray, the upper support member spaced from the upper tray in one of the front-back direction and the width direction, the upper support member adapted to bend about the deformation feature.

5. The battery pack assembly of claim 1, wherein the tray assembly includes an upper support member relative to the height direction, the upper support member spaced from the upper tray in one of the front-back direction and the width direction.

6. The battery pack assembly of claim 4, wherein the upper tray is configured so that a gap is provided between the lower tray and the upper tray, the gap allowing for an upward deformation of the lower tray without a corresponding upward deformation of the upper tray.

7. The battery pack assembly of claim 6, wherein the gap between the lower tray and the upper tray is at a mounting location of the at least one battery back-associated component on the upper tray.

8. The battery pack assembly of claim 5, further including a component tray for mounting of the at least one battery back-associated component, the component tray located in a space between the upper tray and the upper support member and secured to the lower tray.

9. The battery pack assembly of claim 8, wherein the component tray is configured so that a gap is provided between the lower tray and the component tray, the gap allowing for an upward deformation of the lower tray without a corresponding upward deformation of the component tray.

10. A vehicle comprising:
a frame assembly having a side sill and a center member both extended in a front-back direction of the vehicle and cross members extended in a width direction of the vehicle;
a floor panel secured to the frame assembly; and
a battery pack assembly secured under the frame assembly in a height direction of the vehicle, the battery pack assembly including:
a tray assembly on which at least one battery pack-associated component is placed, the tray assembly includes a lower tray and an upper tray relative to the height direction, the lower tray secured to the upper tray, the upper tray with an outboard edge portion and an inboard edge portion relative to the width direction, the outboard edge portion secured to the side sill and the inboard edge portion secured to the center member, wherein a deformation feature is formed on the upper tray and defines a bend location on the upper tray where during a side crash event the tray assembly is displaceable both laterally in the width direction and downward in the height direction.

11. The vehicle of claim 10, wherein a stiffening feature is formed on the upper tray, the stiffening feature adapted to substantially maintain a shape of the outboard edge portion during a side crash event.

12. The vehicle of claim 11, wherein the deformation feature is a groove formed in the upper tray and the stiffening feature is an outwardly extended rib formed in the upper tray.

13. The vehicle of claim 10, wherein the upper tray is configured so that a gap is provided between the lower tray and the upper tray, the gap allowing for an upward deformation of the lower tray without a corresponding upward deformation of the upper tray.

14. The vehicle of claim 13, wherein the gap between the lower tray and the upper tray is at a mounting location of the at least one battery back-associated component on the upper tray.

15. The vehicle of claim 10, wherein the tray assembly includes an upper support member secured to the lower tray, the upper support member spaced from the upper tray in the front-back direction, the deformation feature also formed on the upper support member.

16. The vehicle of claim 15, further including a component tray for mounting of the at least one battery back-associated component, the component tray located in a space between the upper tray and the upper support member and secured to the lower tray, wherein the component tray is configured so that a gap is provided between the lower tray and the component tray, the gap allowing for an upward deformation of the lower tray without a corresponding upward deformation of the component tray.

17. A battery pack assembly for a vehicle, the vehicle including a floor panel secured to a frame assembly having a side sill and a center member both extended in a front-back direction of the vehicle and cross members extended in a width direction of the vehicle, the battery pack assembly comprising:
a tray assembly fixed under the floor panel in a height direction of the vehicle and on which first and second battery pack-associated components are placed, the tray assembly includes a lower tray, an upper tray relative to the height direction, and an upper component tray relative to the height direction, the lower tray secured to the upper tray and the component tray, the first battery pack-associated component mounted to the component tray, the second battery pack-associated component mounted to the upper tray,
wherein the lower tray has an outboard edge portion and an inboard edge portion relative to the width direction, the upper tray has an outboard edge portion and an inboard edge portion relative to the width direction, the outboard edge portion of the upper tray overlays the outboard edge portion of the lower tray and is secured to the side sill, and the inboard edge portion of the upper tray overlays the inboard edge portion of the lower tray and is secured to the center member,
wherein the component tray is configured so that a first gap is provided between the lower tray and the component tray at a mounting location of the first battery pack- associated component, the first gap allowing for an upward deformation of the lower tray without a corresponding upward deformation of the component tray, and
wherein the upper tray is configured so that a second gap is provided between the lower tray and the upper tray at a mounting location of the second battery pack-associated component, the second gap allowing for an upward deformation of the lower tray without a corresponding upward deformation of the upper tray.

18. The battery pack assembly of claim 17, wherein the tray assembly includes an upper support member secured to the lower tray, the upper support member spaced from the upper tray in the front-back direction, and the component tray is located in a space between the upper tray and the upper support member.

19. The battery pack assembly of claim 17, wherein a deformation feature located proximate the inboard edge portion and a stiffening feature located proximate the outboard edge portion are formed on the upper tray, the deformation feature defines a bend location on the upper tray where during a side crash event the tray assembly is displaceable both laterally in the width direction and downward in the height direction, and the stiffening feature maintains a shape of the outboard edge portion during displacement of the tray assembly.

* * * * *